United States Patent [19]

Melton

[11] Patent Number: 4,613,237

[45] Date of Patent: Sep. 23, 1986

[54] METHOD FOR DETERMINING THE TEMPERATURE OF A FLUID

[75] Inventor: Lynn A. Melton, Richardson, Tex.

[73] Assignee: United Technologies Corporation, Hartford, Conn.

[21] Appl. No.: 768,307

[22] Filed: Aug. 22, 1985

[51] Int. Cl.[4] .................... G01K 11/00; G01N 21/64
[52] U.S. Cl. ................................. 374/162; 250/459.1; 436/172
[58] Field of Search .................. 374/17, 159, 123, 162; 250/458.1, 573, 328

[56] References Cited

U.S. PATENT DOCUMENTS

| | | | |
|---|---|---|---|
| 3,865,070 | 2/1975 | Solbrig | 374/162 X |
| 4,213,699 | 7/1980 | Moore | 250/573 X |
| 4,215,275 | 7/1980 | Wickersheim | 374/159 |
| 4,350,661 | 9/1982 | Davis et al. | 250/458.1 X |
| 4,434,364 | 2/1984 | Correa et al. | 250/573 X |
| 4,468,136 | 8/1984 | Murphy et al. | 374/17 |
| 4,470,697 | 9/1984 | Chraplyry et al. | 250/573 X |
| 4,476,870 | 10/1984 | Peterson et al. | 250/458.1 X |
| 4,515,896 | 5/1985 | Melton | 73/861.04 |

OTHER PUBLICATIONS

Proc. Roy. Soc., pp. 289-297 (1964)—'Excimer' Florescence V. Influence of Solvent Viscosity and Temperature—by J. B. Birks, M. D. Lumb and I. H. Munro.
"Photoassociation in Aromatic Systems" Bian Stevens, Department of Chemistry, University of South Florida, 1975, Advances in Photochemistry, vol. 8, pp. 161-226.

Primary Examiner—Daniel M. Yasich
Attorney, Agent, or Firm—A. Dean Olson

[57] ABSTRACT

A method for determining the temperature of a fluid particularly adapted to the determination of droplet temperatures. A fluorescent monomer and a quencher are added to a fluid and the monomer is excited by directing an energy source of a proper wavelength at the fluid. The excited monomer then combines with the quencher to produce a fluorescent exciplex in the fluid. The temperature of the fluid is determined by detecting the fluorescence from the excited monomer and exciplex in the fluid. The ratio of fluorescence of these species provides data from which the temperature can be determined.

1 Claim, 6 Drawing Figures

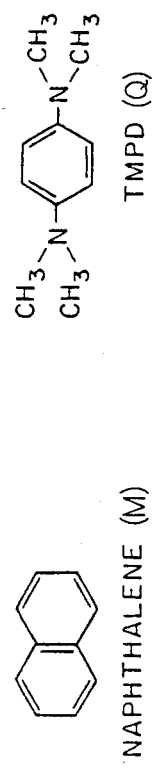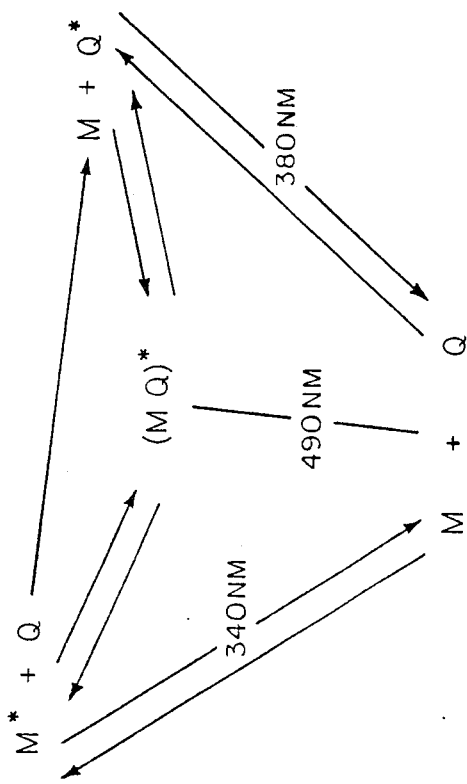
FIG. 1 NAPHTHALENE/TETRAMETHYL P-PHENYLENE DIAMINE PHOTOCHEMISTRY

METHOD FOR DETERMINING THE TEMPERATURE OF A FLUID

The Government has rights in this invention purusant to Contract No. DAAG29-84-C-0010 awarded by the Department of the Army.

TECHNICAL FIELD

The field of art to which this invention pertains is testing methods and specifically methods of determining the temperature of fluids.

BACKGROUND ART

In liquid fueled combustors, the fuel is converted to a spray consisting of a system of fuel droplets, and fuel vapor. Such fuel sprays contain numerous individual droplets which can range in size from about 2 microns ($\mu$) to about 200$\mu$. These droplets must evaporate, and mix with the oxidant, which is generally air, before effective combustion can occur. In attempting to better understand the events which are occurring within these combustors, literally hundreds of theoretical and experimental investigations have been performed concerning a single, isolated droplet as well as the complex, multi-droplet sprays.

When liquid fuel is injected into a hot gas atmosphere as in a gas turbine or diesel engine, the atomized droplets evaporate as heat from the surrounding atmosphere is transferred into the interior regions of the spray. The temperature within the individual spray droplets is thus the key parameter in estimating the heat transfer and the vaporization rates Most conventional experimental methods for spray analysis, i.e. photography, laser light scattering, multiphase probes, etc. do not measure droplet temperature. In addition, although present temperature determining apparatuses such as the optical pyrometer and thermocouples, can be of assistance in studying the heat transfer properties of sprays and fluids they are not useful for determining localized temperatures such as for example, in a droplet. Thus, direct measurement of droplet temperatures has not been possible and mathematical equations have been utilized to estimate droplet temperatures. Most often, it is assumed that the droplet temperature rises rapidly and homogeneously at the boiling point of the fuel. However, recent work regarding internal circulation and multicomponent evaporation has called this assumption into question. Given the importance of determining localized fluid temperatures so that the thermal properties of fluids and sprays may be more accurately determined, there is a need for methods of determining the temperatures of fluids, and in particular, droplets.

Accordingly, there has been a constant search in this field of art for methods of determining the temperatures of fluids, particularly dispersed fluids.

DISCLOSURE OF INVENTION

This invention is directed to a method for determining the temperature of fluids. A fluorescent monomer and quencher are added to a fluid and the monomer is excited by directing an energy source of a proper wave length at the fluid. The excited monomer then combines with the quencher to produce a fluorescent exciplex in the fluid. The temperature of the fluid is determined by detecting the fluorescence of both the fluorescent monomer and exciplex in the fluid.

This invention makes a significant advance in the field of fluid temperature determination by utilizing fluorescent exciplex systems. Thus, it provides a thermal testing method for fluids which may be advantageously applied to internal combustion systems.

The foregoing and other objects, features and advantages will be apparent from the specification, claims and from the accompanying drawings which will illustrate an embodiment of the invention.

BRIEF DESCRIPTION OF DRAWINGS

FIG. 1 is a schematic of the photophysics of a typical exciplex system.

BEST MODE FOR CARRYING OUT THE INVENTION

Figure 2:
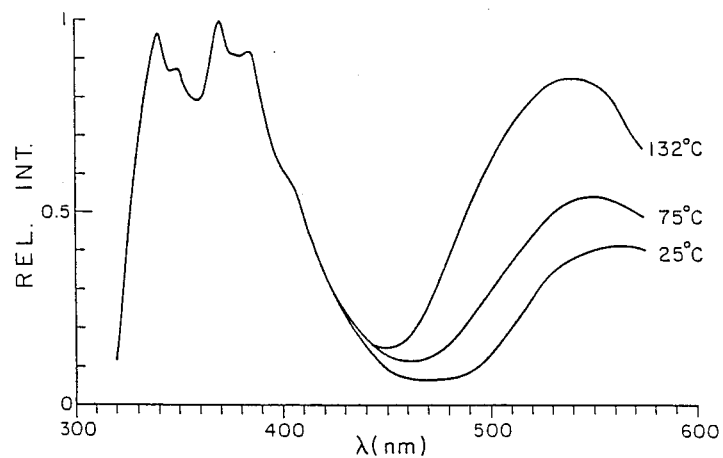
FIG. 2 is a graph of the fluorescence spectra of 3,10 Dicyanophenanthrene/diethylaniline (DCNP/DEA) solutions as a function of temperature.

The exciplex system typically is comprised of a fluorescent monomer M, a quencher molecule Q and an exciplex MQ* formed by the collision of an exited M (M*) molecule and Q molecule (If M is the same as Q, the resulting exciplex is also called an excimer.), such as the system described in commonly assigned U.S. Pat. No. 4,515,896, the disclosure of which is hereby incorporated by reference. M is typically an aromatic or trialkyl amine molecule which can absorb light to form an electronically excited molecule M*. This excited molecule, M*, should have an average lifetime of about 10 nanoseconds to about 100 nanoseconds, during which time it may return to the ground state (M) by emitting light (fluorescence) at a particular wavelength or by combining with Q to form an exciplex MQ*. MQ* may itself return to the ground state by fluorescing at its own wavelength which typically is longer than that of M by about 50 nm to about 150 nm. M should also be chemically stable and soluble in the fluid material under study. A number of candidate materials are listed, along with some of their physical characteristics in Table I. Others will be known to those skilled in the art. It should be noted that the singlet excitation energy cited in the Tables is the energy in electron volts/molecule required to excite the molecule to the energy state at which state it will fluoresce or form the exciplex.

TABLE I

| Molecule | Normal Boiling Point Degrees Centigrade(°C.) | Singlet Excitation Energy Electron Volt (eV)/molecule |
|---|---|---|
| naphthalene | 218 | 3.95 |
| TMPD | 260 | 3.41 |
| anthracene | 340 | 3.22 |
| DCNP | >300 | 3.49 |

Q may be the same molecule as M or it may be any of a number of organic molecules which possess the appropriate electron acceptor and/or donor characteristics to form a fluorescent emitting exciplex with M* and which will be stable at spray-evaporation temperatures or dispersion conditions. Additional, Q should be chemically stable and soluble in the fluid material to be studied. A number of candidate materials which should be useful as Q are listed in Table II. Other materials useful as Q will be known to those skilled in the art.

TABLE II

| Molecule | Normal Boiling Point °C. | Singlet Excitation Energy eV/molecule |
|---|---|---|
| fumaronitrile | 186 | 4.68 |
| 1-cyanonaphthalene | 299 | 3.95 |
| naphthalene | 218 | 3.95 |
| TMPD | 260 | 3.41 |
| DEA | 217 | 3.84 |

When M and Q are properly selected, the wavelengths of the peak fluorescent emissions from M* and MQ* will be substantially different, and for purposes of this invention should be at least 50 nanometers apart. Typically these exciplexes will be strongly emitting and will have binding energies of about 3 Kilocalorie (Kcal)/mole to about 20 Kcal/mole.

Thus, upon irradiation of a sample containing M, Q, and the balance hydrocarbon fuel, M is excited to form M* and the reaction $$M^* + Q <==> E^*$$

begins. Fluorescence can be observed from both electronically excited M* and E* Since E* is bound with respect to M*, it is necessarily at lower energy, and its emission to yield ground state M+Q is red-shifted with respect to the emission from M*. The populations of M* and E*, which are coupled by the above reaction, can be strongly temperature dependent, and thus the ratio of the fluorescence intensity from M* to that emitted from E*, once calibrated, can be used to obtain the temperature of the droplets.

Depending upon the composition and temperature of the specific sensor system, it is possible for the ratio of monomer emission to exciplex emission to increase or to decrease with increasing temperature. In the former case, equilibrium in the above reaction is obtained, and the temperature dependence of the equilibrium constant is the dominant element. The equilibrium constant for the above reaction has the approximate temperature dependence $\exp(-\Delta H/RT)$ where $\Delta H$ is the binding energy of the exciplex with respect to separated M* and Q, R is the gas constant and T is temperature. With increasing temperature, this factor decreases, and the equilibrium shifts away from E* and toward the separate M* and Q.

In the latter case, equilibrium in the above reaction is not obtained, primarily because M* and Q must diffuse towards each other during the several nanoseconds that M* is excited. If the viscosity of the medium is sufficiently high, diffusion is slow, and only a fraction of the M* initially formed actually reacts to form E*. As the temperature rises, the viscosity decreases dramatically, and the thermodynamic equilibrium of the above reaction becomes established. For example, a (3,10-dicyanphenanthrene/diethylaniline/m-xylene) system illustrates the kinetics dominated (diffusion) behavior and a (naphthalene/tetramethyl-p-phenylene diamine/hexadecane) system illustrates the thermodynamics dominated (equilibrium) behavior.

Typically, graphs of temperature vs. the ratio of monomer emission to exciplex emission are especially useful over certain ranges. For example, the ratio of M/E can be so large that the separate components cannot be measured accurately with a single instrument. Also, the rate of change of the ratio of monomer emission to the exciplex emission can be sufficiently low that a small error in the emission measurement can lead to a large error in determining the temperature. Those skilled in the art can easily determine the useful range for an exciplex system.

A number of examples of candidate exciplex systems are listed in Table III. In Table III it should be noted that $\lambda_{max}M$ is the wavelength maxima at which the excited monomer fluoresces; $\lambda_{max}E$ is the wavelength maxima at which the exited exciplex fluoresces and $\Delta H$ is the binding energy of the exciplex.

TABLE III

| Monomer | Quencher | M $\lambda_{max}$ (nm) | E $\lambda_{max}$ (nm) | $\Delta H$ (Kcal/mole) |
|---|---|---|---|---|
| naphthalene | TMPD | 340 | 470 | 14 |
| naphthalene | fumaronitrile | 340 | 440 | 20 |
| TMPD | 1-cyano-naphthalene | 340 | 618 | 26 |
| DCNP | DEA | 390 | 560 | |

One method for designing an appropriate exciplex system is based primarily on the correlations developed by A. Weller and D. Rehm, Zeit, Phys. Chem. (Frankfurt), Vol. 69, 183 (1970), who found that the exciplex binding energy and emission frequency are given by the following two equations:

$$\Delta H = \Delta E_{oo} - [E(A^-/A)] - 0.13 \ E(D/D^+) - eV$$

and $$h\nu_c max = [E(D/D^+)] - E(A^-/A)] - 0.15 \ eV$$

where $\Delta H$ is the binding energy of the exciplex. $\Delta E_{oo}$ is the energy separation between the ground vibrational levels of the ground and first excited singlet electronic states of the monomer, $E(D/D^+)$ and $E(A^-/A)$ are the oxidation potential of the donor molecule, and the reduction potential of the acceptor molecule, measured in acetonitrile, respectively, and $h\nu_c max$ is the energy of the exciplex emission at the maximum of the exciplex emission intensity.

The equilibrium constant (K) for the exciplex formation is given by $$K = \frac{[MQ^*]}{[M^*][Q]} = \exp[-\Delta H - T\Delta S/RT)$$

where S is found be be approximately $-20$ cal/K over a wide range of exciplexes, R. A. Caldwell and D. Creed, Acc. Chem. Res., Vol. 13, 45 (1981), [MQ*] is the exciplex concentration, [M*] is the concentration of the excited monomer, and [Q] is the concentration of the quencher. In addition $\Delta H$ and $\Delta S$ are the respective enthalpy and entropy changes of the reaction: R is the gas constant and T is the absolute temperature. Consequently, use of the fluorescence spectra compiled by I. B. Berlman, *Handbook of Fluorescence Spectra of Aromatic Molecules*, Academic Press, New York, 1971, tables of oxidation and reduction potentials, *Technique of Electroorganic Systhesis*, Part II, Ed. by N. L. Weinberg, Vol. 5, in Techniques of Chemistry, Ed. by A. Weissberger, Wiley-Interscience, New Yorkl, 1975, p. 6–667 ff, and tables of boiling points, *Handbook of Chemistry and Physics*, 62nd Ed., CRC Press, Boca Raton, 1982, allows one to assess the probable usefulness of a wide variety of exciplex systems prior to testing.

The relative fluorescence yields of the exciplex ($\phi_e$) and monomer ($\phi_m$) are given by $$\frac{\phi_e}{\phi_m} = \frac{K_{fe}}{K_{fm}} \frac{[MQ]}{[M]} = \frac{K_{fe}}{K_{fm}} (K[Q])$$

$K_{fe}$ for exciplexes is typically in the range of $10^6$–$10^7$ sec$^{-1}$, R. A. Caldwell and D. Creed, Acc. Chem. Res., Vol. 13, 45 (1981), and $K_{fm}$ can be obtained from Berlman's compilation. $K_{fe}$ and $K_{fm}$ are the rate constant of the fluorescence for the exciplex and monomer, respectively, and [MQ*], [M*], are the concentrations of the exiplex and the excited monomer, K is the equilibrium constant for the reaction and [Q] is the concentration of the quencher.

The fluid material to be studied may be fuel, typically jet fuel, gasoline or a synthetic derivative from coal or shale oil, or any other material which may be dispersed in any spray, vapor-liquid or multiphase system. This temperature determination method depends on the tailored use of aromatic photochemistry and the use of aromatic containing fluids may lead to problems. Typically, after M and Q are introduced, the fluid is made homogenous by mixing, stirring or any other conventional means.

The fluid is then dispersed into droplets and vaporized. Generally, this is done by passing the fluid through a fuel spray nozzle, however, any system which disperses the liquid will do. Typically, the liquid is heated to aid in vaporization of the dispersed liquid. The monomer is then excited by directing a source of energy at it at the proper wavelength. The excited monomer M* then combines with the quencher Q to form the exciplex. This may be accomplished by any of the conventional techniques known to those skilled in the art. Typically, these consist of metal vapor lamps, high pressure arc lamps, laser beams, etc. The vapor and liquid phases and their spatial distribution is then determined by detecting, through use of appropriate optical filters, the fluorescence emitted by M* and MQ* which are present in the liquid phase. This detection may use any number of devices known to those skilled in the art, i.e. photographic film, photomultiplier tubes, diode arrays, etc. One exemplary system is that which is disclosed in FIG. 3 of commonly assigned U.S. Pat. No. 4,515,896.

As a fuel spray heats up and evaporates, it is inevitable that the fluorescent dopants will evaporate. However, the interference from exciplex emission in the vapor phase is negligible, since the relatively polar exciplex is less stable in the vapor phase. But, the emission from monomer vapor may be a problem. Thus, it is preferred to study sprays into air rather than into nitrogen, since oxygen is an efficient quencher of the fluorescence of organic molecules. The atmospheric oxygen readily quenches the vapor phase emissions but does not affect the liquid phase emissions since the time for diffusion of the ambient oxygen into the liquid droplet is long compared to the droplet lifetime.

Finally, it should be noted that the intensity ratio measurements described here imply a particular type of data collection apparatus. It is a possible to photograph doped fuel sprays through filters and to obtain thereby information regarding the temperature distribution in the spray. However, it is especially preferred to image the irradiated section of the spray through two separate filters onto two halves of an electronic array detector. The intensities can then be read point by point, ratioed at the same spatial element, and converted to a temperature at that spatial element.

Example I

A thermal study of a synthetic diesel fuel was undertaken as follows using the present invention showing the kinetics dominated diffusion behavior.

A solution was mixed comprising about 0.04 percent by weight (%) 3,10 dicyanophenanthrene (DCNP), 0.12% diethylanilene (DEA) and m-Xylene. The DEA and m-Xylene, 99+% pure available from Aldrich Chemical Company (Milwaukee, WI) were used without further purification. The DCNP was prepared according to the Ghali N. I, M. S. thesis, "Studies on Substituted 9-Cyanophenanthrene Spectroscopy Fluorescence Quenching and Photocycloaddition with Olefins", University of Texas at Dallas, August, 1974.

The excitation source for all fluorescence spectra was an excimer laser available from Lumonics, operated on the XeCl transition at 308 nm. In a series of demonstrations utilizing the system, a cuvet containing the solution was irradiated by a laser beam. The beam was masked so that only 1–2 milliJoules (mJ)/pulse at 8 Hertz was incident on the fluorescence cuvet. The cuvet was positioned at an angle of approximately 50–55 degrees to the incident beam so that front surface spectra could be obtained from these optically thick solutions without the reflected laser beam entering the monochromator. The fluorescence emitted at 90 degrees to the incident laser beam was focussed through a single quartz lens (5 centimeter diameter; 15 centimeter focal length) onto the entrance slit of a quarter-meter Jarrell-Ash monochromator. The fluorescence was detected with a 1P28 phototube available from RCA, whose output went to an electrometer available from Princeton Applied Research. The amplified output of the electrometer was read by an 8 bit ADC and the results stored in computer readable files.

The cuvet was suspended within an insulated chamber. The cuvet holder allowed rotation of the cuvet about a line contained in its front surface, vertical movement of the cuvet, and movement of the cuvet transverse to the entering laser beam. In this work, the cuvet was held fixed in the front surface fluorescence position. The cuvet chamber was heated with flowing house air which had first flowed over cupric oxide (400° C.) to remove any traces of oil, and then through a final heating section of heating tape wrapped on a glass tube. The temperature, once set, was stable within 1°–2° C. All temperatures were measured with a copper constant and thermocouple located in a groove within the aluminum body of the cuvet holder, approximately 2 millimeters behind the back wall of the cuvet.

Figure 3:
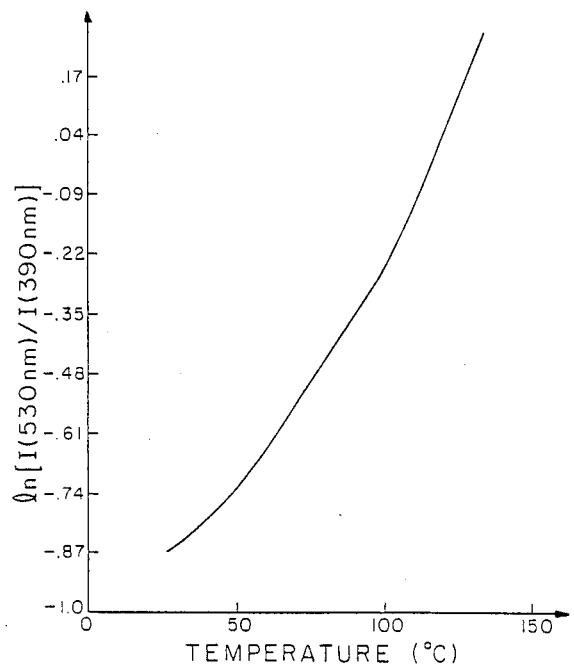
FIG. 3 is a graph of the logarithm of the ratio of the DCNP/DEA exciplex fluorescence intensity at 530 nanometers (nm) to the DEA monomer fluorescence intensity at 390 nm as a function of temperature.

The fluorescence from DEA peaked at 340 nm and that from DCNP peaked at 390 nm: at room temperature the exciplex fluorescence peaks at approximately 560 nm. The spectra shown in FIG. 2 illustrate the effect: as the temperature was raised the emission from the exciplex relative to that from the two monomers became stronger. In FIG. 3, the logarithm of the ratio of the corrected emission intensity at 530 nm (E*) to that at 390 nm (DCNP*) was plotted as a function of temperature. The ratio increased rapidly with temperature, starting with a value of about 0.4 at 25° C. and rising to 1.3 at 130° C.

In the region between 25° and 130° C., the intensity ratio changed by about 1.1% per degree centigrade. This means that a measurement of the intensity ratio which is accurate within 1% yielded a temperature determination which is accurate within 1° C.

EXAMPLE II

A thermal study of a synthetic diesel fuel was undertaken in a similar fashion to the previous experiment except this demonstrated the thermodynamics dominated (equilibrium) behavior.

A solution was mixed comprising about 2.5% TMPD and 1.0% naphthalene in hexadecane. The TMPD served as the monomer M and the naphthalene served as the quencher Q. The naphthalene was scintillation grade (99+%) and the TMPD was 98% purity, both of which were available from the Aldrich Chemical Company. The cetane was a practical grade (97%) available from Kodak Corporation. All chemicals were used without further purification except TMPD which was sublimed at 4 torr and 30° to 40° C. The apparatus described in Example I was again used.

Figure 4:
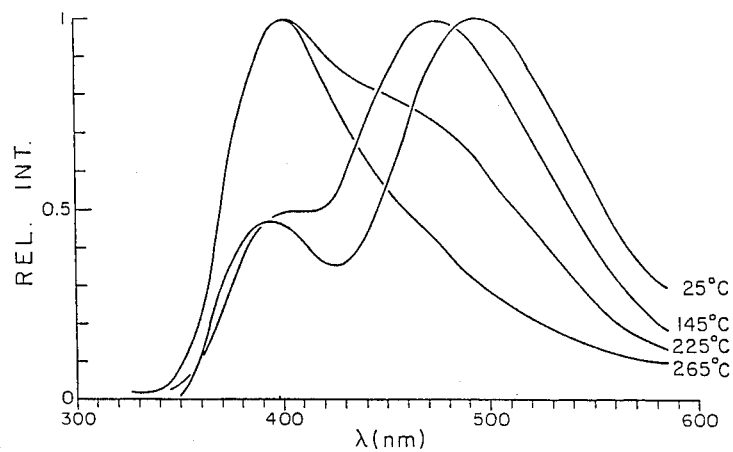
FIG. 4 is a graph of the fluorescence spectra of naphthalene/N,N,N',N'-tetramethyl-p-phenylene diamine (N/TMPD) solutions as a function of temperature.
Figure 5:
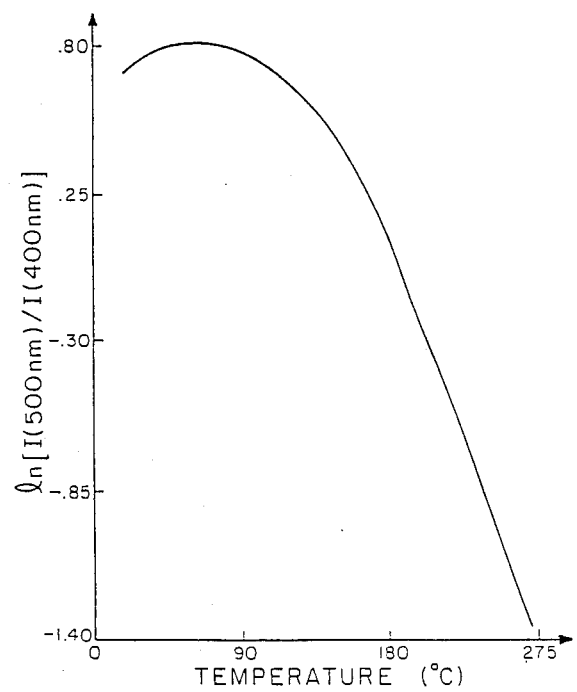
FIG. 5 is a graph of the logarithm of the ratio of the N/TMPD exciplex fluorescecnce intensity at 500 nm to the N monomer fluorescence intensity at 400 nm as a function of temperature.

A schematic of the photochemical system is shown in FIG. 1 which represents the chemical reactions which take place in this system and the fluorescent wavelengths of each excited species. FIG. 4 shows the spectra obtained with this system as a function of temperature. Between 25° C. and 140° C. the changes in the spectra are quite modest. But between 140° and 265° C., the changes are dramatic. FIG. 5 summarizes these changes more quantitatively: the logarithm of the ratio of the fluorescence intensity at 500 nm (E*) to that at 400 nm (TMPD*) is plotted as a function of temperature. In this case, the intensity ratio decreases as the temperature increases. In the range 140° C. to 265° C., the intensity ratio increases by approximately 1.5% per degree centigrade, and since, if the intensity ratio can be measured within 1% then the temperature can be determined within 1° C.

Figure 6:
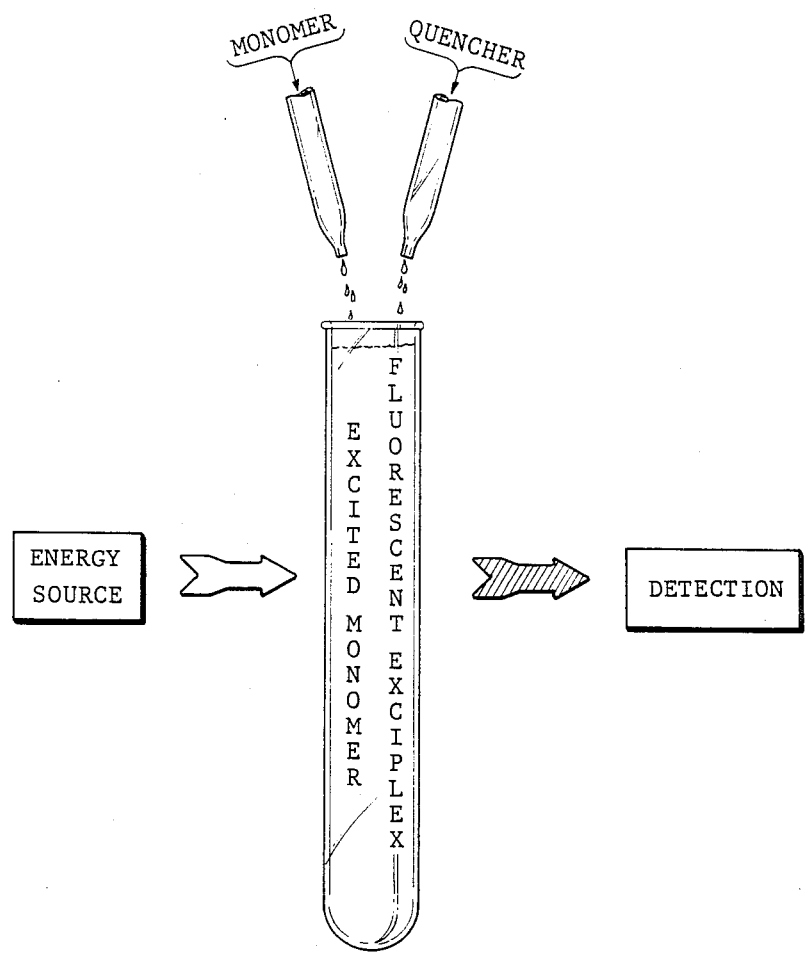
FIG. 6 is a schematic of a temperature determination system.

FIG. 6 represents a schematic of an exemplary fluid temperature determination method disclosed herein and as incorporated by reference from commonly assigned U.S. Pat. No. 4,515,896.

Although these temperature determinations are important, the variation of the temperature within spray droplets is also important. In the optically thin limit, where either the dopants (M and Q) are present in very low concentrations or the excitation takes place at wavelengths where they are weakly absorbing, the fluorescent molecules within spray droplets are uniformly excited. In this case, the emission from a single droplet is a volume averaged temperature, and the emission from a spatial element in the spray is weighted towards the volume averaged temperatures of the largest drops in that element since they contribute the greatest fluorescence intensity. In the optically thick limit, one cannot dope the entire spray, but it is possible to study isolated single droplets or to inject a doped probe droplet into an undoped spray. In either case, with accessible molecular extinction coefficients of 10,000 liter/mole-centimeter and dopant concentrations in the few weight percent range, it is possible to achieve complete absorption of the incident light within the first 10 microns of liquid, i.e., within the 10 micron "skin" of a 100 micron diameter droplet. The relative exciplex/monomer emission from this optically thick droplet is a measure of a "skin temperature".

Examples of industries which have a need for this information are the automobile industry and the aerospace engine industry. Both of these industries are concerned with the combustion of sprayed fluids. A great deal of time and money is spent on research in this area trying to improve techniques for getting better dispersion, phase distribution, fuel and oxidant mixture, etc. to improve engine efficiency and power. The temperature of droplets in the spray is an important parameter in these investigations. Much of the effort is involved in designing fuel injection or combustors to achieve the improvement. The present method can supply the information concerning these designs quickly and accurately. In addition, the temperatures of bulk fluids may be determined by painting exciplex systems on surfaces or flowing them through transparent parts such as combustion nozzles in jet engines.

Other industries which may find this method helpful are the paint manufacturers and ink manufacturers. Their primary concern would be in developing proper techniques and fluid systems which would improve their spray application or jet application systems. Another industry which may find this method helpful is the steam boiler industry.

It should be understood that the invention is not limited to the particular embodiment shown and described herein, but that various changes and modifications may be made without departing from the spirit or scope of this concept as defined by the following claim.

I claim:
1. A method for determining at least one temperature of a fluid comprising:
 (a) adding a fluorescent monomer and an organic quencher to a fluid;
 (b) exciting the monomer by directing an energy source of a proper wavelength at the fluid, the excited monomer than comines with the quencher to produce a fluorescent exciplex in the fluid; and
 (c) determining the temperature of the fluid by detecting the relative fluorescence from the excited monomer and exciplex in the fluid.

* * * * *

UNITED STATES PATENT AND TRADEMARK OFFICE
CERTIFICATE OF CORRECTION

PATENT NO. : 4,613,237

DATED : September 23, 1986

INVENTOR(S) : Lynn A. Melton

It is certified that error appears in the above-identified patent and that said Letters Patent is hereby corrected as shown below:

Col. 3, line 6, "Additional" should read --Additionally--.

Col. 4, line 39 " $\Delta H = \Delta E_{oo} - [E(A^-/A)] - 0.13\ E(D/D^+) - eV$ " should read --$\Delta H = \Delta E_{oo} - [E(D/D^+) - E(A^-/A] - 0.13 eV$--

Col. 8, line 52 "than comines" should read --then combines--.

Signed and Sealed this

Thirteenth Day of January, 1987

Attest:

DONALD J. QUIGG

Attesting Officer — Commissioner of Patents and Trademarks